US008570933B2

(12) United States Patent
Lioliou et al.

(10) Patent No.: US 8,570,933 B2
(45) Date of Patent: Oct. 29, 2013

(54) SELF-INTERFERENCE SUPPRESSION IN FULL-DUPLEX MIMO RELAYS

(75) Inventors: Panagiota Lioliou, Molndal (SE); Mats Viberg, Molnlycke (SE); Mikael Coldrey, Landvetter (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 174 days.

(21) Appl. No.: 13/288,475

(22) Filed: Nov. 3, 2011

(65) Prior Publication Data
US 2012/0106405 A1    May 3, 2012

Related U.S. Application Data

(60) Provisional application No. 61/409,571, filed on Nov. 3, 2010.

(51) Int. Cl.
*H04J 1/10*    (2006.01)

(52) U.S. Cl.
USPC ............ 370/315; 370/338; 370/252; 370/293

(58) Field of Classification Search
None
See application file for complete search history.

(56) References Cited

U.S. PATENT DOCUMENTS

| 5,642,353 A | * | 6/1997 | Roy et al. ............... 370/329 |
| 2010/0167768 A1 | * | 7/2010 | Tsutsui ............... 455/500 |
| 2010/0214964 A1 | | 8/2010 | Larsson et al. |

FOREIGN PATENT DOCUMENTS

| EP | 2161853 A2 | 3/2010 |
| WO | 2008004916 A1 | 1/2008 |

OTHER PUBLICATIONS

Larsson, P., et al., "MIMO On-Frequency Repeater with Self-Interference Cancellation and Mitigation", 2009 IEEE 69th Vehicular Technology Conference, Apr. 26-29, 2009, Barcelona, Spain, IEEE, Piscataway, NJ, USA, Apr. 26, 2009, pp. 1-5, XP031474618.
International Search Report and Written Opinion issued on Feb. 13, 2012 in PCT Application No. PCT/EP2011/069360, 9 pages.

* cited by examiner

*Primary Examiner* — Duc C Ho
(74) *Attorney, Agent, or Firm* — Rothwell, Figg, Ernst & Manbeck, P.C.

(57) ABSTRACT

A method, and an apparatus, for self-interference suppression in a relay for wireless communication, wherein the relay is arranged for receiving a signal r(n) transmitted from a transmitter, and for transmitting a self-interference suppressed transmit signal xr(n) to a receiver. The self-interference suppressed transmit signal xr(n) is achieved by determining a receive suppression filter matrix Wr, determining a relay amplification matrix G, and determining a transmit suppression filter matrix Wt, and then applying the suppression filters and the amplification matrix to the received signal r(n).

10 Claims, 7 Drawing Sheets

SELF-INTERFERENCE SUPPRESSION IN FULL-DUPLEX MIMO RELAYS

CROSS-REFERENCE TO RELATED APPLICATION

This application claims the benefit of U.S. Provisional Patent Application No. 61/409,571, filed on Nov. 3, 2010. The contents of the provisional application are incorporated by reference herein.

TECHNICAL FIELD

The invention relates in general to the field of relaying nodes, and more particularly, to the field of relays in wireless multiple-input multiple-output (MIMO) communication systems.

BACKGROUND

The use of MIMO architectures wireless communications systems promises to enhance the capacity of these wireless communications systems by taking advantage of the multipath propagation. The use of multiple transmit and receive antennas in a multipath environment, offers not only spectral efficiency through spatial multiplexing, but also increases reliability through diversity.

Combining MIMO transceivers with relaying networks has been identified as a promising technique for extending the coverage area, combating the shadowing effects, decreasing the power requirements at the transmitter, and for reducing infrastructure deployment costs of the wireless communications systems. Relaying nodes may be employed to forward the data to the destination which is otherwise out of the reach of the source such as in rocky or urban environments, where there are strong shadowing effects. Relays may also be useful for indoor coverage, subways and underground tunnels.

Different relaying strategies have been developed over the last years, and the two most common are regenerative relays, for which a Decode-and-Forward scheme (DF) is needed, and degenerative relays, for which an Amplify-and-Forward scheme (AF) is needed. AF relays are of particular interest since their low complexity and easy deployment (together with their comparable performance) make them attractive from a practical point of view.

Generally, relays are assumed to operate in half-duplex mode where the relay is not receiving and transmitting at the same time or at the same frequency. A drawback with half-duplex relays is that they require two orthogonal channels for transmission and reception, and thus incur a spectral efficiency penalty. Alternatively, the relay can operate in a full-duplex mode where the relay can receive and transmit simultaneously resulting in no loss in spectral efficiency. However, a critical drawback with the full-duplex operation is the resulting self-interference, caused by coupling from the relay's transmission to its own reception, which may severely limit the performance of the relay.

Thus, finding a way to reduce the effects of the self-interference between the output and input of the relay, without the drawbacks described above, is highly sought after.

SUMMARY OF THE INVENTION

With the above description in mind, then, an aspect of the present invention is to reduce at least some of the mentioned deficiencies with the prior art solutions and to provide relay employing self-interference suppression for use in a wireless communication network between a transmitter and a receiver.

As will be described in more detail by the aspects of the present invention below, one way to provide self-interference suppression in a relay for wireless communication is to apply receive and/or transmit suppression filtering to signal being forwarded by the relay, according to the aspects of the present invention below.

A first aspect of the present invention relates to a method for self-interference suppression in a relay for wireless communication, wherein said relay being a part of a communication channel between a transmitter and a receiver in a wireless communication system, said relay being arranged for receiving a signal r(n) transmitted from said transmitter, and transmitting a self-interference suppressed transmit signal $x_r(n)$ to said receiver, said communication channel having a transmit channel, defined by a transmit channel matrix ($H_1$) between said transmitter and said relay, a receive channel, defined by a receive channel matrix ($H_2$) between said relay and said receiver, and a self-interference channel between an relay output and a relay input of said relay, the self-interference channel being defined by a self-interference channel matrix ($H_0$), characterized in that the method comprises the steps, receiving at the relay input of said relay a receive signal r(n) transmitted from said transmitter over said transmit channel, determining a receive suppression filter matrix $W_r$, in said relay, based on said transmit channel matrix ($H_1$) and said self-interference channel matrix ($H_0$), determining a transmit suppression filter matrix $W_t$, in said relay, based on said receive suppression filter matrix $W_r$, said receive channel matrix ($H_2$), and said self-interference channel matrix ($H_0$), determining a self-interference suppressed transmit signal $x_r(n)$ by applying said receive suppression filter matrix $W_r$, a relay amplification matrix G and said transmit suppression filter matrix $W_t$, to said received signal r(n), and transmitting said self-interference suppressed transmit signal $x_r(n)$ from said relay over said receive channel to said receiver.

The method, wherein said receive signal r(n) may be given by $r(n)=H_1 x_s(n)+H_0 x_r(n)+n_R(n)$, wherein $x_r(n)$ is the transmitted relay signal, and $n_R(n)$ is the noise contribution at the relay.

The method, wherein the receive suppression filter matrix $W_r$ may be determined by the optimal receive suppression matrix which is given by $W_{r,opt}=U^H(H_0 H_0^H)^{-1/2}$ wherein the columns of U are the corresponding generalized eigenvectors of the matrix $(H_0 H_0^H)^{-1/2} H_1 H_1^H (H_0 H_0^H)^{-1/2}$.

The method, wherein the transmit suppression filter matrix $W_t$ may be determined by the optimal transmit suppression matrix which is given by $W_{t,opt}=(\tilde{H}_0^H \tilde{H}_0)^{-1/2}\overline{U}$ wherein $\tilde{H}_0=W_{r,opt}H_0$ and matrix $\overline{U}$ is obtained by applying a generalized eigenvalue decomposition of the matrix $(\tilde{H}_0^H \tilde{H}_0)^{-1/2} H_2^H H_2 (\tilde{H}_0^H \tilde{H}_0)^{-1/2}$, wherein the columns of matrix $\overline{U}$ are the corresponding eigenvectors.

The method, wherein said forming of said self-interference suppressed transmit signal $x_r(n)$ may be done according to $x_r(n)=W_t G W_r r(n)$.

A second aspect of the present invention relates to a relay adapted for self-interference suppression in a wireless communication system, wherein said relay being a part of a communication channel between a transmitter and a receiver in a wireless communication system, wherein said communication channel having a transmit channel, defined by a transmit channel matrix ($H_1$) between said transmitter and said relay, a receive channel defined by a receive channel matrix ($H_2$), between said relay and said receiver, and a self-interference channel between an relay output and a relay input of said relay, the self-interference channel being defined by a self-interference channel matrix ($H_0$), said relay comprising, a receiver unit adapted to receive a receive signal r(n) transmitted from said transmitter over said transmit channel, a first processing unit adapted to determine a receive suppression filter matrix $W_r$, based on said transmit channel matrix ($H_1$) and said self-interference channel matrix ($H_0$), a second processing unit adapted to determine a transmit suppression filter matrix $W_t$, based on said receive suppression filter matrix $W_r$, said receive channel matrix ($H_2$), and said self-interference channel matrix ($H_0$), a third processing unit adapted to determine a relay amplification matrix G, a fourth processing unit adapted to produce a self-interference suppressed transmit signal $x_r(n)$ by applying said receive suppression filter matrix $W_r$ from said first processing unit, said transmit suppression filter matrix $W_t$ from said second processing unit, and said relay amplification matrix G from said third processing unit to said receive signal r(n), wherein said fourth processing unit is further adapted to supply said self-interference suppressed transmit signal $x_r(n)$ to a transmitter unit, and said transmitter unit is adapted to receive said self-interference suppressed transmit signal $x_r(n)$ from said fourth processing unit, and adapted to transmit said self-interference suppressed transmit signal $x_r(n)$ to said receiver over said transmit channel. In a variant the first, second, third and fourth processing units may all be implemented in a single processing unit. In another variant the channel matrices $H_0$, $H_1$ and $H_2$ may be stored in one or more memories in the relay and supplied to the processing unit or units when needed in a calculation.

The relay, wherein said receive signal r(n) received by said receiver may be given by $r(n)=H_1 x_s(n)+H_0 x_r(n)+n_R(n)$ wherein $x_r(n)$ is the transmitted relay signal, and $n_R(n)$ is the noise contribution at the relay.

The relay, wherein said first processing unit may further be adapted to determine said receive suppression filter matrix $W_r$ by determining the optimal receive suppression matrix according to $W_{r,opt}=U^H(H_0 H_0^H)^{-1/2}$ wherein the columns of U are the corresponding generalized eigenvectors of the matrix $(H_0 H_0^H)^{-1/2} H_1 H_1^H (H_0 H_0^H)^{-1/2}$.

The relay, wherein said second processing unit may further be adapted to determine said transmit suppression filter matrix $W_t$ by calculating the optimal transmit suppression matrix according to $W_{t,opt}=(\tilde{H}_0^H \tilde{H}_0)^{-1/2} \tilde{U}$ wherein $\tilde{H}_0 = W_{r,opt} H_0$ and matrix $\tilde{U}$ is obtained by the generalized eigenvalue decomposition of the matrix $(\tilde{H}_0^H \tilde{H}_0)^{-1/2} H_2^H H_2 (\tilde{H}_0^H \tilde{H}_0)^{-1/2}$, and its columns are the corresponding eigenvectors.

The relay, wherein said producing, in said fourth processing unit (704), of said self-interference suppressed transmit signal $x_r(n)$ may be done according to $x_r(n)=W_t G W_r r(n)$.

The size of the gain matrix G may be selected such that it matches the receive and transmit filter matrices. Typically, it is also chosen such that it satisfies some practical amplification and power constraint. The G matrix may be stored in a memory in said delay and supplied to the processing unit or units when needed in a calculation.

The different variations within each aspect described above may freely be combined in any way possible.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Henceforth in the description vectors are denoted with lower case letters in bold and italic and matrices are denoted with capital letters in bold and italic.

Figure 1:
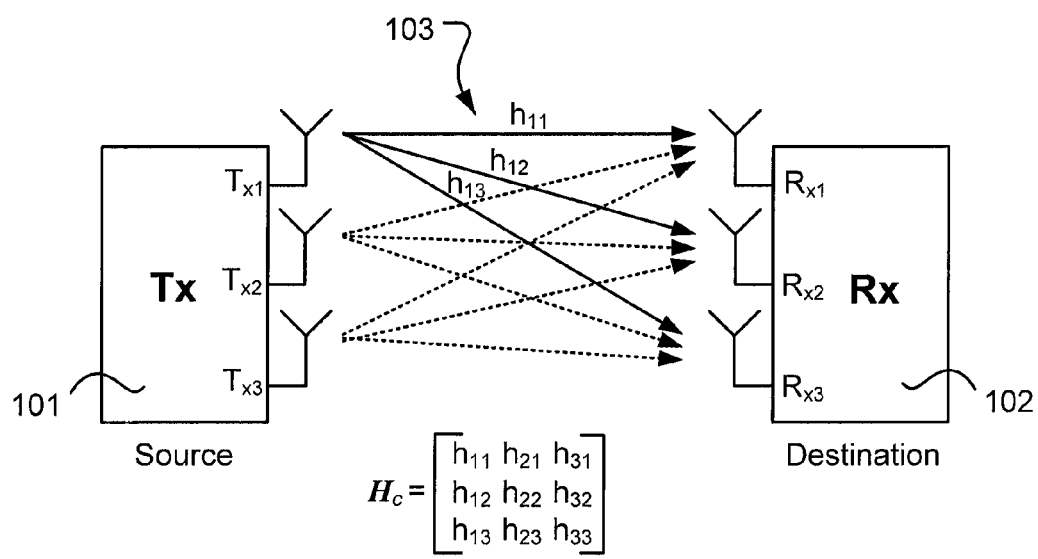
FIG. 1 shows a MIMO wireless communication channel without a relay function.

FIG. 1 shows an example of a multiple-input multiple-output (MIMO) wireless communication system 100 comprising a source 101, typically a transmitter (Tx), having three output antennas $T_{x1}$-$T_{x3}$, a destination 102, typically a receiver (Rx), having three input antennas $R_{x1}$-$R_{x3}$, and a communication channel 103. In this example there is one data stream per antenna while in other examples several data streams may be mixed on the same antenna (usually referred to as precoding). The antenna $T_{x1}$ in FIG. 1 transmits a signal to each of $R_{x1}$, $R_{x2}$ and $R_{x3}$ antennas. A channel coefficient $h_{11}$ in the communication channel 103 defines attenuation and phase shift between $T_{x1}$ and $R_{x1}$. In the same manner channel coefficient $h_{12}$ defines attenuation and phase shift between $T_{x1}$ and $R_{x2}$, and channel coefficient $h_{13}$ defines attenuation and phase shift between $T_{x1}$ and $R_{x3}$. The communication channel 103 between $T_{x1}$ and all the receive antennas at the receiver at the destination 102 can be represented by a channel vector $h_1=[h_{11}, h_{12}, h_{13}]$. In the same manner the channel between $T_{x2}$ and all the receive antennas at the receiver 102 can be represented by a channel vector $h_2=[h_{21}, h_{22}, h_{23}]$ and the channel between $T_{x3}$ and all the receive antennas at the receiver 102 with a channel vector $h_3=[h_{31}, h_{32}, h_{33}]$. In a MIMO wireless communication system 100 the information from the transmitter at the source 101 is, in this example, transmitted in multiple data streams over the communication channel 103 represented by the three channel vectors $h_1$, $h_2$ and $h_3$. The communication channel 103 may then be represented by a matrix having the three channel vectors $h_1$, $h_2$ and $h_3$ as columns in the matrix as shown in FIG. 1. The communication channel is said to have full rank if the three channel vectors $h_1$, $h_2$ and $h_3$ are linearly independent. In a communication channel 103 with multipath propagation and scattering of the signals between the transmitter at the source 101 and receiver at the destination 102 this is often, but not necessarily always, the case. The maximum rank of the communication channel $H_c$ in this example is thus 3. In general, the maximum possible rank is limited by the transmitter at the source 101 or the receiver at the destination 102 having the least number of antennas.

Figure 2:
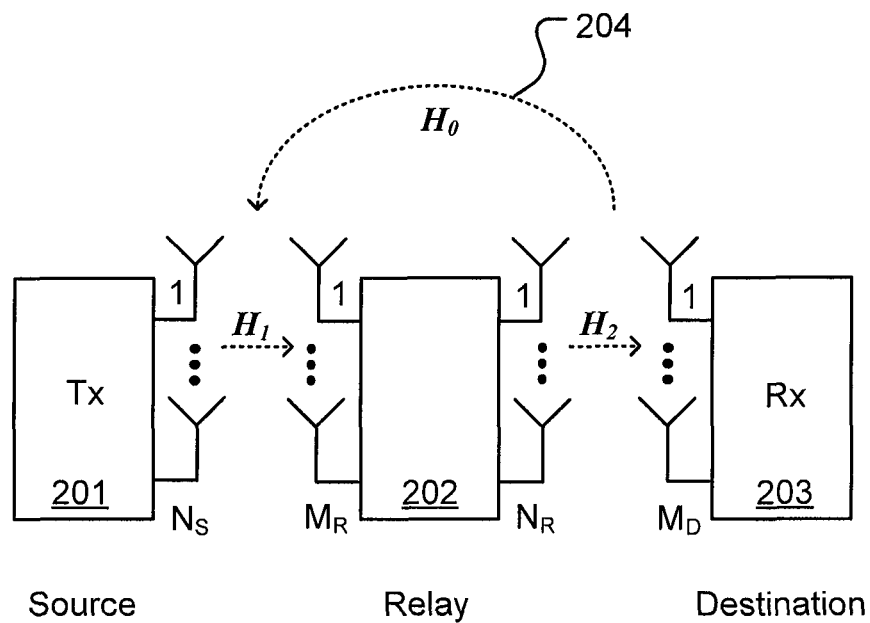
FIG. 2 schematically shows an example of a MIMO wireless communication system with a relay forwarding signals from a source to a destination according to prior art.

A MIMO wireless communication system 200 according to prior art is shown in FIG. 2. The MIMO wireless communication system 200 is comprised of a source 201, a destination 203, and a relay station 202 relaying the transmitted information from the source to the destination. The source, being a transmitter (Tx), has $N_S$ transmitter antennas, the destination, being a receiver (Rx), has $M_D$ receiver antennas and the relay station (hereinafter referred to as a relay) has $M_R$ input antennas and $N_R$ output antennas. The direct channel between the transmitter 201 and the receiver 203 is omitted since it is assumed that it is very weak compared to the relayed channel. A weak direct channel is actually the motivation for installing a relay between the source 201 and destination 203 in the first place. Besides, the direct channel is independent of the self-interference channel and does not provide any information on how to suppress it. Thus we have three channels in the MIMO wireless communication system 200 shown in FIG. 2; a transmit channel between the transmitter 201 and a relay 202 input defined by a transmit channel matrix $H_1$, a receive channel which is a channel between a relay 202 output and the transmitter 203 defined by a receive channel matrix $H_2$, and finally a self-interference channel 204 between the relay output (the 1 ... $N_R$ antennas in FIG. 2) and relay input (1 ... $M_R$ antennas in FIG. 2) defined by a self-interference channel matrix $H_0$. As discussed in the background section the main problem with a full-duplex MIMO relay is the self-interference caused by poor isolation between the relay output and relay input, which may severely impact the performance of a relay 202. Thus, finding a way to suppress the self-interference channel 204 is therefore highly sought after.

Figure 3:
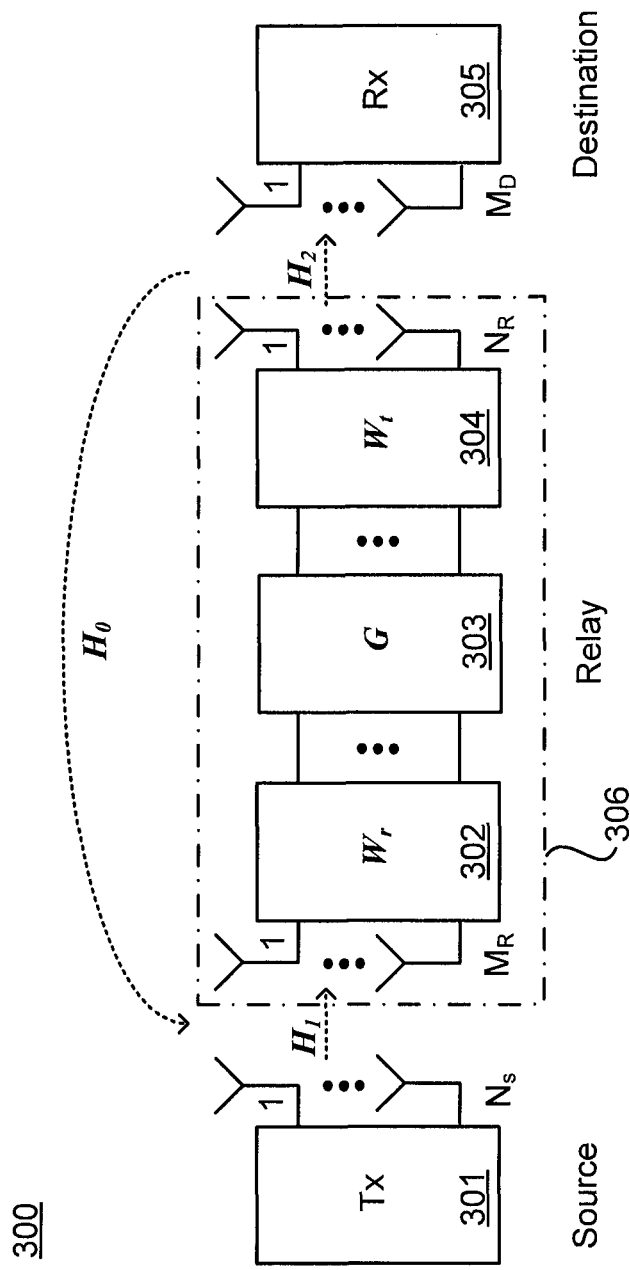
FIG. 3 schematically shows an example of a MIMO wireless communication system, according to an embodiment of the present invention.

A MIMO wireless communication system 300, according to an embodiment of the present invention, employing a method for self-interference suppression in a full-duplex MIMO relay 306 is disclosed in FIG. 3. The MIMO wireless communication system 300 comprises a source 301, typically a MIMO wireless communication transmitter (Tx), a destination 305, typically a MIMO wireless communication receiver (Rx), and a full-duplex MIMO relay 306 (indicated by the solid and dotted line). The full-duplex MIMO relay (hereinafter referred to as the relay) 306 comprises a unit 302 for determining a receive suppression matrix $W_r$, a unit 303 for determining a relay amplification matrix G, and a unit 304 for determining a transmit suppression matrix $W_t$. The transmitter 301 and the receiver 305 are equipped with $N_S$ and $M_D$ antennas, respectively. The relay 306 has $M_R$ receive and $N_R$ transmit antennas, and the relay's main purpose is to filter, amplify and to relay MIMO signals transmitted by the transmitter 301 to the receiver 305. Matrices $H_1$, and $H_2$ represents the source-to-relay, and relay-to-destination channel matrices, respectively. Matrix $H_1$ is referred to as the transmit channel matrix and the matrix $H_2$ is referred to as the receive channel matrix. For simplicity reasons, we assume that the direct transmitter 301 to receiver 305 link is blocked or non-existing (and therefore not shown in the figure), for example due to shadowing or the like. The self-interference matrix between the relay output and the relay input (i.e. between the $M_R$ receive and $N_R$ transmit antennas) of the relay 306 is denoted by $H_0$.

The method, according to an embodiment of the present invention, for suppression of the self-interference channel 204 may be described as follows. Let $x_s(n)$ be the signal transmitted by the transmitter 301 in FIG. 3. The relay 306 filters 302,304, amplifies 303 and forwards the received signal vector r(n) to the transmitter. The channel matrices $H_0$, $H_1$ and $H_2$ are considered to be known by the relay. The channel matrices may for instance be supplied to the relay by another node in the wireless communication system, or determined in the relay by some suitable method. The supplied and/or determined channel matrices may be stored in a memory in the relay 306. The received signal r(n) at the relay 306 may be expressed as $$r(n)=H_1 x_s(n)+H_0 x_r(n)+n_R(n), \quad (1)$$

wherein $x_r(n)$ is the transmitted signal from the relay output, and $n_R(n)$ is the noise contribution at the relay input. The received signal r(n) at the relay input comprise at least one signal or data stream transmitted from the transmitter 301. As shown in FIG. 1, the relay 306 determines and applies a receive suppression filter $W_r$ 302 and a transmit suppression filter $W_t$ 304 for suppressing the self-interference channel $H_0$ in the received signal r(n). The dimensions of the matrices $W_r$ and $W_t$, are $M_R$ and $N_R$, respectively. Hence, the self-interference suppressed transmitted signal $x_r(n)$ at the relay output, may be expressed as $$x_r(n)=W_t G W_r r(n) \quad (2)$$

wherein G is a relay amplification matrix 303 that represents the complex relay amplifiers which may be used for amplifying the weak received signal r(n). The size of the gain matrix G may be selected such that it matches the receive and transmit filter matrices. Typically, it is also chosen such that it satisfies some practical amplification and power constraint. As for the receiver 305, it receives the self-interference suppressed transmitted signal $x_r(n)$ from the relay 306, and the received signal may be expressed as $$y_d(n)=H_2 x_r(n)+n_D(n) \quad (3)$$

wherein $n_D(n)$ is the noise contribution at the receiver 305. After substituting (1) and (2) into (3), the received signal $y_d(n)$ at the receiver 305 may be rewritten as $$y_d(n)=Hx_s(n)+w(n) \quad (4)$$

where $$H=H_2 \tilde{G} H_1, \quad (5)$$

$$w(n)=H_2 \tilde{G} n_R(n)+n_D(n), \text{ and} \quad (6)$$

$$\tilde{G}=(I_{N_R}-W_t G W_r H_0)^{-1} W_t G W_r. \quad (7)$$

Thus, H and w(n) correspond to the equivalent (compound) channel matrix and noise, respectively and $I_{NR}$ is the identity matrix. Based on the system model described in (4), the next section considers the choice of the self-interference receive and transmit suppression filter matrices, $W_r$ and $W_t$.

Ideally, a criterion function for jointly determining the optimal receive and transmit suppression filters, $W_r$ and $W_t$, respectively may be formed. For instance, one could either choose to maximize the signal to interference ratio (SIR) at the relay input 302 or maximize the SIR at the relay output 304. However, since it is not possible to arrive at a tractable, closed form solution for the optimal filter, the simpler two step approach according to the present invention may be used.

Firstly, begin by determining the receive suppression filter matrix, $W_r$, and neglecting the transmit suppression filter matrix $W_t$. The goal is to reduce the power of the self-interference signal and at the same time improve the useful signal power received by the relay. Hence, the aim is to maximizing the SIR at the relay input according to $$\max_{W_r} \frac{\|W_r H_1\|_F^2}{\|W_r H_0\|_F^2} \quad (8)$$

or equivalently, $$\max_{W_r} \frac{Tr\{W_r H_1 H_1^H W_r^H\}}{Tr\{W_r H_0 H_0^H W_r^H\}}. \quad (9)$$

If we assume that the matrix $H_0 H_0^H$ is invertible, then the solution to (9) may be obtained by solving the generalized eigenvalue problem. Therefore, the optimal receive suppression matrix may then be determined as $$W_{r,opt} = U^H (H_0 H_0^H)^{-1/2} \quad (10)$$

wherein the columns of U are the corresponding generalized eigenvectors of the matrix $(H_0 H_0^H)^{-1/2} H_1 H_1^H (H_0 H_0^H)^{-1/2}$.

After deriving the receive suppression filter matrix $W_r = W_{r,opt}$, the second step is to proceed with the determination of a transmit suppression matrix $W_t$. The aim of the second step is to maximize the ratio between the power of the useful signal at the relay output to the remaining self-interference power. In other words, maximizing the SIR at the relay transmit side. The remaining self-interference may then be expressed as $$\tilde{H}_0 = W_{r,opt} H_0 \quad (11)$$

wherein $W_{r,opt}$ is given by (10). The SIR maximization problem may now be formulated at the relay output as $$\max_{W_t} \frac{\|H_2 W_t\|_F^2}{\|\tilde{H}_2 W_t\|_F^2}. \quad (12)$$

or equivalently, $$\max_{W_t} \frac{Tr\{H_2 W_t W_t^H H_2^H\}}{Tr\{\tilde{H}_0 W_t W_t^H \tilde{H}_0^H\}}. \quad (13)$$

Similarly to (10), the optimal transmit suppression filter matrix be determined by $$W_{t,opt} = (\tilde{H}_0^H \tilde{H}_0)^{-1/2} \overline{U} \quad (14)$$

wherein the matrix $\overline{U}$ is obtained by the generalized eigenvalue decomposition of the matrix $(H_0 H_0^H)^{-1/2} H_1 H_1^H (H_0 H_0^H)^{-1/2}$, and its columns are the corresponding eigenvectors. The derived optimal transmit suppression filter matrix $W_{t,opt}$ is thus equal to $W_r$.

Thus, by first applying, according to equation (2), the determined receive suppression filter matrix $W_r = W_{r,opt}$ to the received signal vector $r(n)$, followed by the relay amplification matrix G and lastly the transmit suppression filter matrix $W_t = W_{t,opt}$, a full-duplex relay with self-interference suppression may be achieved according to the present invention.

Figure 4:
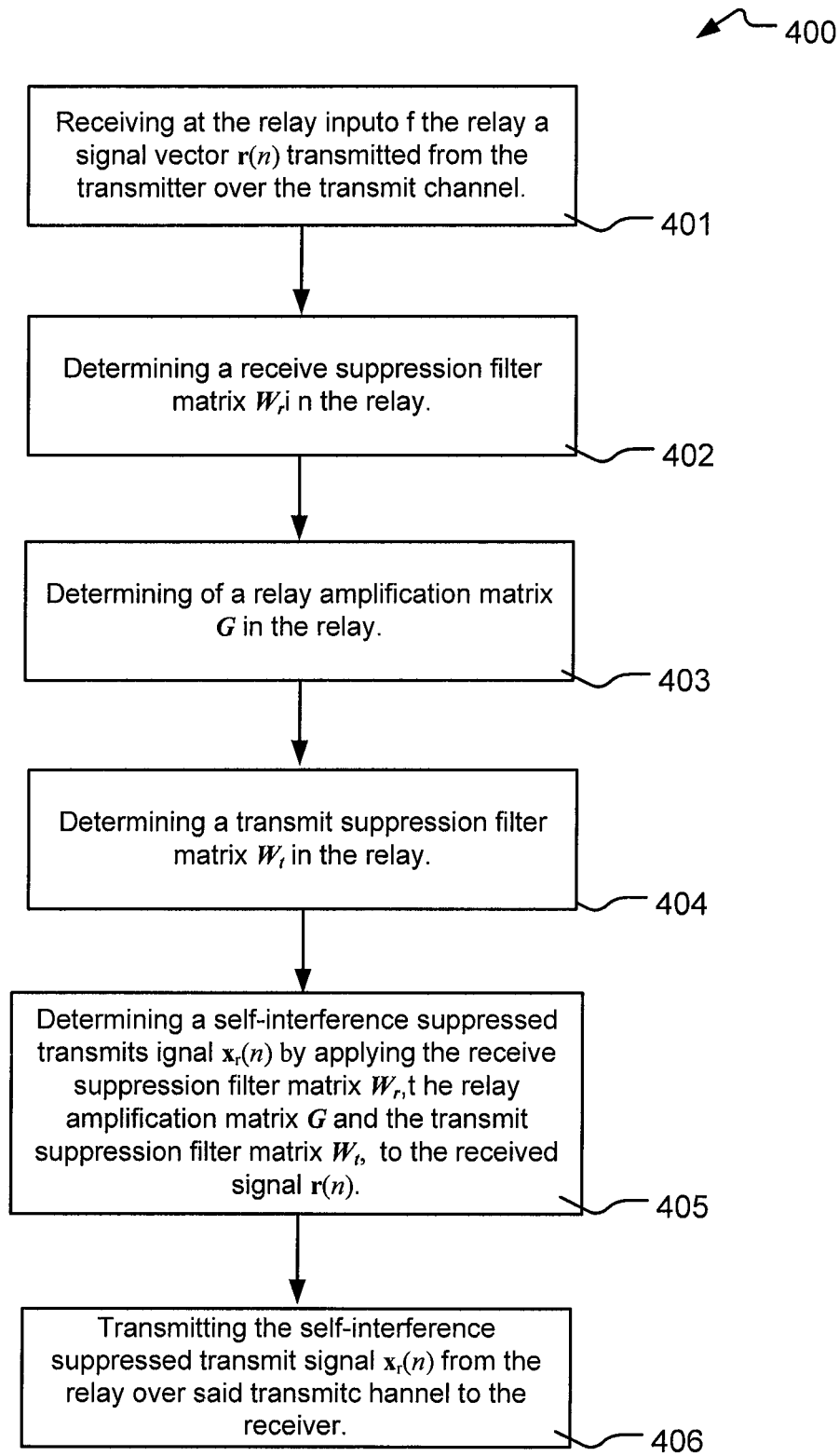
FIG. 4 shows a flowchart describing the main step of an method according to an embodiment of the present invention.

FIG. 4 shows a flowchart describing the main steps in the method for self-interference suppression according to the description above. The first step (401) describes the reception, at the relay input of the relay (306), of a signal vector r(n) transmitted from the transmitter (301) over the transmit channel. The second step (402) describes the determination of a receive suppression filter matrix $W_r$ in the relay (306). The third step (403) describes the determination of a relay amplification matrix G in the relay (306). The fourth step (404) describes the determination of a transmit suppression filter matrix $W_t$ in the relay (306). The fifth step (405) describes the determination of a self-interference suppressed transmit signal $x_r(n)$ by applying the suppression filter matrix $W_r$ determined in the second step (402), the relay amplification matrix G determined in the third step (403), and the transmit suppression filter matrix $W_t$ determined in the fourth step (404) to the received signal r(n) received in the first step (401). The sixth and last step describes the transmission of the determined, in the fifth step (405), self-interference suppressed transmit signal $x_r(n)$ from the relay (306) over said transmit channel to the receiver (305). It should be understood that the steps in the method described above does not necessarily be performed in the order described above. It is quite clear for the person skilled in the art that especially the second, third and fourth step may be performed in the reverse order and that the fifth step may be divided into further steps.

Figure 5:
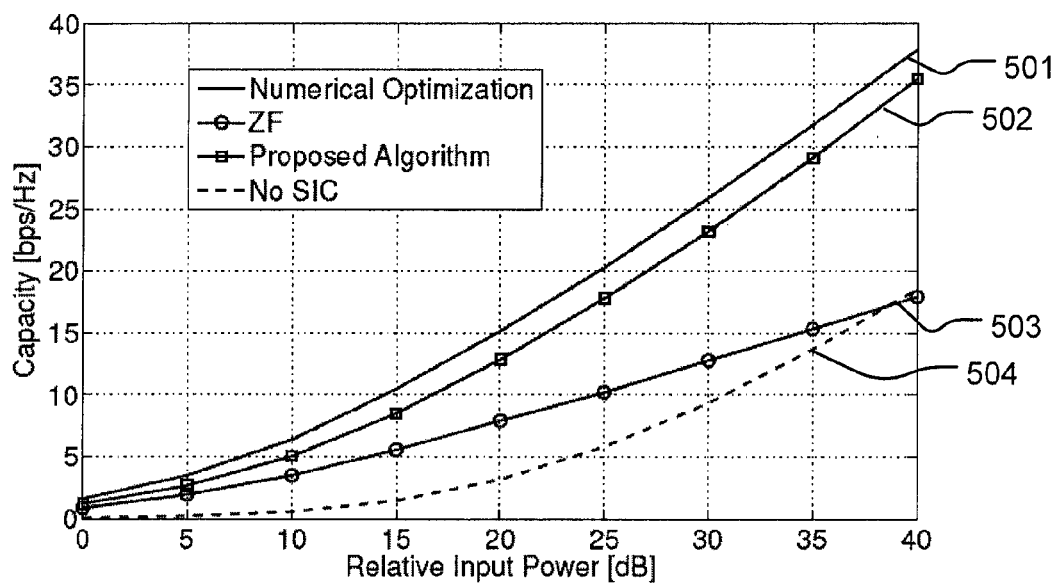
FIG. 5 shows a simulation result according to the present invention in comparison with other known algorithms.
Figure 6:
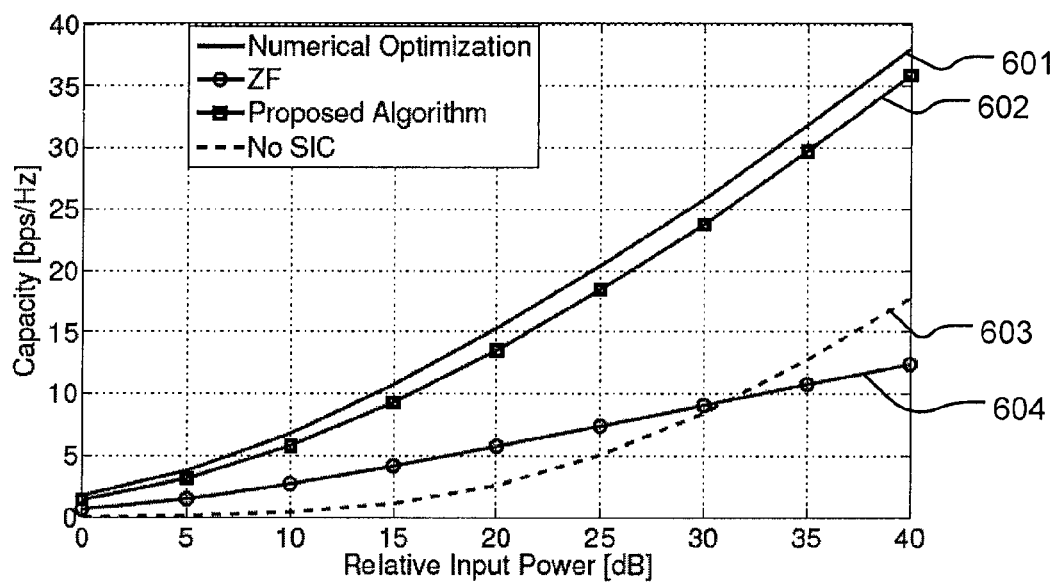
FIG. 6 shows yet another simulation result according to the present invention in comparison with other known algorithms.

FIGS. 5 and 6 presents simulation results 500,600 for the disclosed self-interference suppression method described above. In FIGS. 500,600 the performance of the disclosed self-interference suppression method, shown as a solid line with boxes 502,602, is compare to the well-known zero forcing (ZF) algorithm, shown as a solid line with circles 503,604, and to the conventional AF scheme with no self-interference cancellation (SIC), shown as a jagged line 504, 603. In the conventional AF scheme with no SIC 504, 603, the gain matrix G is given by $G = g_{max} I_{NR}$, wherein $g_{max}$ is the maximum available amplification gain and $I_{NR}$ is the identity matrix. The gain matrix G may in this example be a diagonal matrix.

Since the relay 306 cannot exceed its maximum output power, its amplification gain depends on its input power. In the no self-interference cancellation case, the relay input power consists of the power received from the transmitter 301 as well as the self-interference power which results in less amplification gain. The simulation set up can be described as follows. The transmitter 301, the relay 306 and the receiver 305 are equipped with four transmitting and four receiving antennas, i.e., $N_S = M_D = N_R = M_R = 4$. It may be assumed that the transmitter-to-relay and relay-to-receiver channels experience independent Rayleigh fading. Hence, the transmit channel matrix $H_1$, and the receive channel matrix $H_2$ are independent matrices containing independent identically distributed (i.i.d) elements, which are distributed as $\sim \mathcal{CN}(0,1)$. For the self-interference channel two different cases are considered.

In the first simulation case, shown in FIG. 5, the self-interference channel is modelled as a rank one, Line of Sight (LoS) MIMO channel, and in the second simulation case, shown in FIG. 6, the self-interference channel is modelled as a full rank (with probability 1), Rayleigh fading channel with i.i.d elements distributed as $\sim \mathcal{CN}(0,1)$. For simplicity, it is assume that the noise variances at the relay 306 and the receiver 305 are equal, $\sigma_r^2 = \sigma_d^2 = \sigma^2$. However, the results are also valid if $\sigma_r^2 \neq \sigma_d^2$. The noise is also assumed to be white Gaussian noise (AWGN). In the simulations, the non-tractable optimum gain matrix G which serves as the capacity upper bound has been obtained using the function fmincon in the optimization toolbox of the well-known computer program MATLAB.

The plots in FIGS. 5 and 6 illustrate the capacity as a function of the relative input power $P_0/(2N_0)$, wherein $N_0 = \sigma^2$ denotes the noise power. The plot in FIG. 5 shows the simulation results 500 obtained when $H_0$ is a LoS channel. It is obvious from the figure that disclosed self-interference suppression method 502 improves the system performance. For high Signal-to-Noise ratio (SNR) the disclosed method 502 outperforms the ZF 503 technique while only suffering from a small SNR loss compared to the numerically optimized capacity upper bound 501.

The plot in FIG. 6 shows the simulation 600 but for a full rank self-interference channel. For ZF 604 we select to cancel out the singular values of $H_0$ that exceed 10% of the maximum singular value. The disclosed invention improves significantly the system performance even when $H_0$ is a full rank channel matrix. However, the performance of ZF 604 deteriorates, especially in the high SNR regime. The deterioration in performance of the ZF 604 technique is based on the fact that ZF reduces the number of available degrees of freedom and simply increases the available amplification gain which is of no use in the high SNR regime. This can be also seen by studying the slope of the capacity curves in FIGS. 5 and 6. Which is evident from the FIGS. 500,600, the disclosed method 502,602 has the same slope (degrees of freedom) as the numerical optimization 501,601 and suffers only a small SNR penalty. On the other hand, ZF 503,604 has a smaller slope that indicates a loss in degrees of freedom.

The present invention described in detail above proposes a self-interference suppression method for full-duplex (AF) relays 300. It can be used in any wireless standard that employs any type of repeater or relay. The disclosed method suppresses the self-interference signal by applying receive and transmit suppression filters at the relay (306). The optimal filters (302,304) are designed by taking into account not only the self-interference channel, but also the useful channels. As shown by the simulation results in FIGS. 5 and 6, the disclosed method 502,602 outperforms the existing zero forcing 503,604 technique and significantly improves the system performance.

Figure 7:
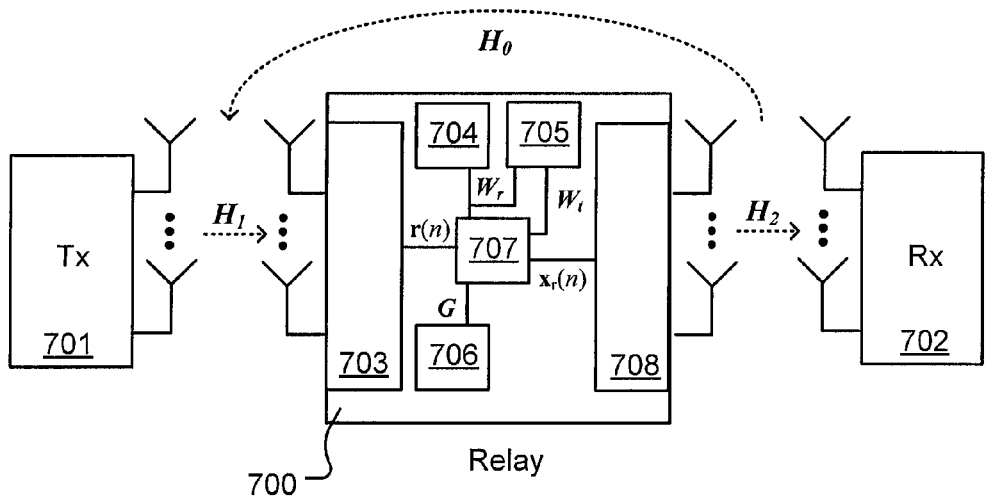
FIG. 7 shows a block diagram of wireless communication system comprising a transmitter, a relay adapted for self-interference suppression in a wireless communication system according to an embodiment of the present invention.

FIG. 7 shows a block diagram of wireless communication system employing a relay (700) adapted for self-interference suppression in a wireless communication system according to an embodiment of the present invention. The wireless communication system also comprising a transmitter (701) and a receiver (703). The relay (700) being a part of a communication channel between a transmitter (701) and a receiver (702) in a wireless communication system, wherein the communication channel having a transmit channel, defined by a transmit channel matrix ($H_1$) between the transmitter (701) and the relay (700), a receive channel defined by a receive channel matrix ($H_2$), between the relay (700) and said receiver (702), and a self-interference channel between an relay output and a relay input of said relay (700), the self-interference channel being defined by a self-interference channel matrix ($H_0$). The relay (700) comprising a receiver unit (703) adapted to receive a receive signal r(n) transmitted from said transmitter over said transmit channel, a first processing unit (704) adapted to determine a receive suppression filter matrix $W_r$, based on said transmit channel matrix ($H_0$) and said self-interference channel matrix ($H_0$), a second processing unit (705) adapted to determine a transmit suppression filter matrix $W_t$, based on said receive suppression filter matrix $W_r$ (704), said receive channel matrix ($H_2$), and said self-interference channel matrix ($H_0$). The relay (700) further comprise a third processing unit (706) adapted to determine a relay amplification matrix G, a fourth processing unit (707) adapted to produce a self-interference suppressed transmit signal $x_r(n)$ by applying said receive suppression filter matrix $W_r$ from said first processing unit (704), said transmit suppression filter matrix $W_t$ from said second processing unit (705), and said relay amplification matrix G from said third processing unit (706) to said receive signal r(n), wherein said fourth processing unit (707) is further adapted to supply said self-interference suppressed transmit signal $x_r(n)$ to a transmitter unit (708), and said transmitter unit (708) is adapted to receive said self-interference suppressed transmit signal $x_r(n)$ from said fourth processing unit (707), and adapted to transmit said self-interference suppressed transmit signal $x_r(n)$ to said receiver (702) over said transmit channel.

The receive signal r(n) received by said receiver (703) in FIG. 7 is given by $r(n)=H_1 x_s(n)+H_0 x_r(n)+n_R(n)$ wherein $x_r(n)$ is the transmitted relay signal, and $n_R(n)$ is the noise contribution at the relay (700).

The first processing unit (704) in FIG. 7 is further adapted to determine said receive suppression filter matrix $W_r$ by determining the optimal receive suppression matrix according to $W_{r,opt}=U^H(H_0 H_0^H)^{-1/2}$ wherein the columns of U are the corresponding generalized eigenvectors of the matrix $(H_0 H_0^H)^{-1/2} H_1 H_1^H (H_0 H_0^H)^{-1/2}$.

The second processing unit (705) in FIG. 7 is further adapted to determine said transmit suppression filter matrix $W_t$ by calculating the optimal transmit suppression matrix according to $W_{t,opt}=(\tilde{H}_0^H \tilde{H}_0)^{-1/2}\tilde{U}$ wherein $\tilde{H}_0 = W_{r,opt} H_0$ and the matrix $\tilde{U}$ is obtained by the generalized eigenvalue decomposition of the matrix $(\tilde{H}_0^H \tilde{H}_0)^{-1/2} H_2^H H_2 (\tilde{H}_0^H \tilde{H}_0)^{-1/2}$, and its columns are the corresponding eigenvectors.

The producing, in said fourth processing unit (707) in FIG. 7, of said self-interference suppressed transmit signal $x_r(n)$ is done according to $x_r(n)=W_t G W_r r(n)$.

Embodiments of the present invention above have been described using a MIMO wireless communication system. However, it should be noted that the present invention may also be applied in other types of wireless communication systems such as for instance in a single-input multiple-outputs (SIMO) wireless communication system, a multiple-input single-output (MISO) wireless communication system or a single-input single output (SISO) wireless communication system.

The relay (306) described above is equivalent to, or a part of, what in the field of wireless communication is called a relay station, relay equipment, a node, a wireless network node, a base station, a base station relay, or a repeater (for wireless communication). However, for the sake of simplicity the term relay was chosen to be used in the description.

In a variant of the embodiment of the present invention described above the matrices $W_r$ and $W_t$ may not have been determined in the relay (306) but instead supplied to the relay (306) from another node in the wireless communication system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for self-interference suppression in a relay for wireless communication, wherein said relay is a part of a communication channel between a transmitter and a receiver in a wireless communication system, said relay being arranged for receiving a signal r(n) transmitted from said transmitter, and transmitting a self-interference suppressed transmit signal $x_r(n)$ to said receiver, said communication channel having a transmit channel, defined by a transmit channel matrix ($H_1$) between said transmitter and said relay, a receive channel, defined by a receive channel matrix ($H_2$) between said relay and said receiver, and a self-interference channel between an relay output and a relay input of said relay, the self-interference channel being defined by a self-interference channel matrix ($H_0$), the method comprising:

receiving at the relay input of said relay a receive signal r(n) transmitted from said transmitter over said transmit channel;

determining a receive suppression filter matrix $W_r$, in said relay, based on said transmit channel matrix ($H_1$) and said self-interference channel matrix ($H_0$);

determining a transmit suppression filter matrix $W_t$, in said relay, based on said receive suppression filter matrix $W_r$, said receive channel matrix ($H_2$), and said self-interference channel matrix ($H_0$);

determining a self-interference suppressed transmit signal $x_r(n)$ by applying said receive suppression filter matrix $W_r$, a relay amplification matrix G and said transmit suppression filter matrix $W_t$, to said received signal r(n); and transmitting said self-interference suppressed transmit signal $x_r(n)$ from said relay over said receive channel to said receiver.

2. The method according to claim 1, wherein said receive signal r(n) is given by $$r(n)=H_1 x_s(n)+H_0 x_r(n)+n_R(n)$$

wherein $x_r(n)$ is the transmitted relay signal, and $n_R(n)$ is the noise contribution at the relay.

3. The method according to claim 1, wherein said receive suppression filter matrix $W_r$ is determined by the optimal receive suppression matrix which is given by $$W_{r,opt}=U^H(H_0 H_0^H)^{-1/2}$$

wherein the columns of U are the corresponding generalized eigenvectors of the matrix $(H_0 H_0^H)^{-1/2} H_1 H_1^H (H_0 H_0^H)^{-1/2}$.

4. The method according to claim 1, wherein said transmit suppression filter matrix $W_t$ is determined by the optimal transmit suppression matrix which is given by $$W_{t,opt}=(\tilde{H}_0^H \tilde{H}_0)^{-1/2}\overline{U}$$

wherein $\tilde{H}_0=W_{r,opt}H_0$ and matrix $\overline{U}$ is obtained by applying a generalized eigenvalue decomposition of the matrix $(\tilde{H}_0^H \tilde{H}_0)^{-1/2} H_2^H H_2 (\tilde{H}_0^H \tilde{H}_0)^{-1/2}$, wherein the columns of matrix $\overline{U}$ are the corresponding eigenvectors.

5. The method according to claim 1, wherein said determining of said self-interference suppressed transmit signal $x_r(n)$ is done according to $x_r=W_t G W_r r(n)$.

6. A relay adapted for self-interference suppression in a wireless communication system, wherein said relay is configured to be a part of a communication channel between a transmitter and a receiver in a wireless communication system, said communication channel having a transmit channel, defined by a transmit channel matrix ($H_1$), between said transmitter and said relay, a receive channel, defined by a receive channel matrix ($H_2$), between said relay and said receiver, and a self-interference channel between a relay output and a relay input of said relay, the self-interference channel being defined by a self-interference channel matrix ($H_0$), said relay comprising:

a receiver unit adapted to receive a receive signal r(n) transmitted from said transmitter over said transmit channel;

a first processing unit adapted to determine a receive suppression filter matrix $W_r$, based on said transmit channel matrix ($H_1$) and said self-interference channel matrix ($H_0$);

a second processing unit adapted to determine a transmit suppression filter matrix $W_t$, based on said receive suppression filter matrix $W_r$, said receive channel matrix ($H_2$), and said self-interference channel matrix ($H_0$);

a third processing unit adapted to determine a relay amplification matrix G; and a fourth processing unit adapted to produce a self-interference suppressed transmit signal $x_r(n)$ by applying said receive suppression filter matrix $W_r$ from said first processing unit, said transmit suppression filter matrix $W_t$ from said second processing unit, and said relay amplification matrix G from said third processing unit to said receive signal r(n), wherein said fourth processing unit is further adapted to supply said self-interference suppressed transmit signal $x_r(n)$ to a transmitter unit; wherein said transmitter unit is adapted to receive said self-interference suppressed transmit signal $x_r(n)$ from said fourth processing unit, and adapted to transmit said self-interference suppressed transmit signal $x_r(n)$ to said receiver over said transmit channel.

7. The relay according to claim 6, wherein said receive signal r(n) received by said receiver is given by $$r(n)=H_1 x_s(n)+H_0 x_r(n)+n_R(n)$$

wherein $x_r(n)$ is the transmitted relay signal, and $n_R(n)$ is the noise contribution at the relay.

8. The relay according to claim 6, wherein said first processing unit is further adapted to determine said receive suppression filter matrix $W_r$ by determining the optimal receive suppression matrix according to $$W_{r,opt}=U^H(H_0 H_0^H)^{-1/2}$$

wherein the columns of U are the corresponding generalized eigenvectors of the matrix $(H_0 H_0^H)^{-1/2} H_1 H_1^H (H_0 H_0^H)^{-1/2}$.

9. The relay according to claim 6, wherein said second processing unit is further adapted to determine said transmit suppression filter matrix $W_t$ by calculating the optimal transmit suppression matrix according to $$W_{t,opt}=(\tilde{H}_0^H \tilde{H}_0)^{-1/2}\overline{U}$$

wherein $\tilde{H}_0 = W_{r,opt} H_0$ and the matrix $\overline{U}$ is obtained by the generalized eigenvalue decomposition of the matrix $(\tilde{H}_0^H \tilde{H}_0)^{-1/2} H_2^H H_2 (\tilde{H}_0^H \tilde{H}_0)^{-1/2}$, and its columns are the corresponding eigenvectors.

10. The relay according to claim 6, wherein said producing, in said fourth processing unit, of said self-interference suppressed transmit signal $x_r(n)$ is done according to $x_r = W_t G W_r r(n)$.

* * * * *

UNITED STATES PATENT AND TRADEMARK OFFICE
CERTIFICATE OF CORRECTION

PATENT NO. : 8,570,933 B2
APPLICATION NO. : 13/288475
DATED : October 29, 2013
INVENTOR(S) : Lioliou et al.

It is certified that error appears in the above-identified patent and that said Letters Patent is hereby corrected as shown below:

In the Drawings

In Fig. 4, Sheet 4 of 7, for Tag "401", in Line 1, delete "inputo f" and insert -- input of --, therefor.

In Fig. 4, Sheet 4 of 7, for Tag "402", in Line 2, delete "$W_r i\ n$" and insert -- $W_r$ in --, therefor.

In Fig. 4, Sheet 4 of 7, for Tag "405", in Line 2, delete "transmits ignal" and insert -- transmit signal --, therefor.

In Fig. 4, Sheet 4 of 7, for Tag "405", in Line 3, delete "$W_r, t\ he$" and insert -- $W_r$, the --, therefor.

In Fig. 4, Sheet 4 of 7, for Tag "406", in Line 3, delete "transmitc hannel" and insert -- transmit channel --, therefor.

In the Specifications

In Column 3, Line 43, delete "matrix" and insert -- the matrix --, therefor.

In Column 3, Line 48, delete "(704)," and insert -- (707), --, therefor.

In Column 3, Line 67, delete "function; and" and insert -- function; --, therefor.

In Column 4, Line 3, delete "art; and" and insert -- art; --, therefor.

In Column 4, Line 6, delete "invention; and" and insert -- invention; --, therefor.

In Column 4, Lines 8-9, delete "invention; and" and insert -- invention; --, therefor.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,570,933 B2

In Column 4, Line 61, delete "matrix" and insert -- matrix $H_c$ --, therefor.

In Column 4, Line 62, delete "matrix" and insert -- $H_c$ matrix --, therefor.

In Column 4, Line 63, delete "channel" and insert -- channel $H_c$ --, therefor.

In Column 5, Line 26, delete "transmitter 203" and insert -- transmitter 201 --, therefor.

In Column 7, Lines 38-39, after Equation (12), delete ".".

In Column 7, Lines 53-54, delete " $(H_0 H_0^H)^{-1/2} H_1 H_1^H (H_0 H_0^H)^{-1/2},$ " and insert -- $(\tilde{H}_0^H \tilde{H}_0)^{-1/2} H_?^H H_? (\tilde{H}_0^H \tilde{H}_0)^{-1/2}$ --, therefor.

In Column 8, Line 24, delete "FIGS. 500,600" and insert -- FIGS. 5 and 6 --, therefor.

In Column 9, Line 19, delete "FIGS. 500,600," and insert -- FIGS. 5 and 6, --, therefor.

In Column 9, Line 55, delete "($H_0$)" and insert -- ($H_1$) --, therefor.

In the Claims

In Column 12, Line 7, in Claim 5, delete "$x_r=W_t G W_r r(n)$." and insert -- $x_r(n)=W_t G W_r r(n)$. --, therefor.